US005390234A

United States Patent [19]

Bar-Noy et al.

[11] Patent Number: 5,390,234
[45] Date of Patent: Feb. 14, 1995

[54] DYNAMIC TRACKING OF MOBILE STATIONS IN WIRELESS NETWORKS

[75] Inventors: Amotz Bar-Noy; Ilan Kessler, both of Bronx, N.Y.

[73] Assignee: International Business Machines Corporation, Armonk, N.Y.

[21] Appl. No.: 871,253

[22] Filed: Apr. 20, 1992

[51] Int. Cl.⁶ ................... H04M 11/00; H04Q 7/00
[52] U.S. Cl. .......................... 379/59; 379/60; 455/33.1; 455/33.2; 455/33.4
[58] Field of Search .................. 379/58, 59, 60; 455/33.1, 33.2, 33.4, 54.1, 54.2, 56.1

[56] References Cited

U.S. PATENT DOCUMENTS

| | | | |
|---|---|---|---|
| 4,475,010 | 10/1984 | Huensch et al. | 455/56.1 |
| 4,696,027 | 9/1987 | Bonta | 374/60 |
| 4,718,081 | 1/1988 | Brenig | 379/60 |
| 4,765,753 | 8/1988 | Schmidt | 379/60 |
| 4,876,738 | 10/1989 | Selby | 455/56.1 |
| 4,916,728 | 4/1990 | Blair | 379/59 |
| 5,109,528 | 4/1992 | Uddenfeldt | 379/60 |
| 5,175,867 | 12/1992 | Wejke et al. | 379/60 |
| 5,203,010 | 4/1993 | Felix et al. | 379/60 |
| 5,214,789 | 5/1993 | George | 455/33.2 |
| 5,222,248 | 6/1993 | McDonald | 455/56.1 |
| 5,239,676 | 8/1993 | Strawczynski | 455/33.2 |
| 5,243,598 | 9/1993 | Lee | 379/60 |

Primary Examiner—Stephen Chin
Assistant Examiner—Vijay Shankar
Attorney, Agent, or Firm—Douglas W. Cameron

[57] ABSTRACT

A method of tracking mobile stations in a cellular network. A mobile station will report to a base station only when the mobile station is turned on and only after having made a minimum number of intercellular movements. When communications with a mobile station is desired, the mobile station is searched for only in the neighborhood of the most recent current cell, which is the last cell from which the mobile station reported to the base station.

4 Claims, 2 Drawing Sheets

DYNAMIC TRACKING OF MOBILE STATIONS IN WIRELESS NETWORKS

DESCRIPTION

1. Technical Field

This invention relates to a method of tracking the location of mobile stations in a cellular network.

2. Description of the Prior Art

Cellular mobile communications are exploding throughout the world, and are now an established part of many communications networks. Future mobile wireless networks are at present a topic of intense interest for research and development.

A cellular architecture is a hierarchical structure that consists of two levels: a level consisting of mobile units and a level comprising fixed stationary base stations. The mobile units are the devices that are used by the mobile stations in order to communicate with the fixed network as well as to communicate with each other. The base stations are fixed devices that on one side communicate with the mobile units through wireless links, and on the other side are connected to the fixed network by wired links. The collection of base stations together with the fixed network form a wired backbone of the wireless network. Associated with each base station, there is a geographic area, called cell, within which a mobile unit can communicate with this base station. In order to cover the entire area and to insure continuity of communications, cells must overlap. For more details on cellular networks see [1], which is hereby incorporated by reference.

The mobile stations of a cellular network move continually within the geographic area covered by the network. Whenever there is a need to communicate with a station, the communication is established via the base station that is associated with the cell in which the mobile is currently located. The problem is that the location of any particular mobile station may not be known at a time when there is a need to communicate with it. A possible solution to this problem is to force each mobile station to transmit an update message whenever it moves to a new cell (this solution is used by Ericsson for its Mobilex network [2] and is also described in [3], which is hereby incorporated by reference). However, as this solution implies many transmissions of updating messages, it is too expensive for networks in which there are a large number of highly mobile stations and very small cells, and also for networks in which transmission of the mobile units are very costly.

Examples of networks that possess the above two properties are indoor mobile wireless networks. Such networks are considered at present in IBM Research [4]. In these networks, the typical size of a cell can be the size of an office. For example, if the physical channel is based on infrared technology, then the line-of-sight requirement makes it impossible to have cells that are larger than the size of a room. In addition, in such networks the mobile units are hand-held and therefore operate on batteries. This implies a power budget limitation which makes transmissions very costly (transmission consumes much more energy than any other operation).

Another possible solution to the above problem is that mobile users never update the system regarding their locations. Clearly, this solution avoids the problem of too many updating transmissions. However, adopting this solution implies that whenever there is a need to communicate with a particular user, a network-wide search for that mobile station is performed. Such a search is again a very expensive operation.

Thus, there are two basic operations involved in tracking mobile users, namely, update and find. With each of these operations there is a certain cost associated. The two extreme solutions described above demonstrate the fact that decreasing one of these two costs necessitates increasing the other one. In other words, the more updating messages that are sent by the mobile users, the less the system has to search for the users, and vice versa. A basic problem is the design of a scheme for tracking mobile stations which has a low total cost per user.

There are tracking schemes in prior art which are neither one or the two extreme solutions described above. One scheme is described in U.S. Pat. No. 4,456,793. The mechanism described in this patent is based on periodical polling of the mobile stations by the cellular system. However, there is no attempt to optimize the above cost per user. Another scheme is described in U.S. Pat. No. 4,775,999. In this patent, the entire network is partitioned into paging areas, each of which consists of a number of cells. The mobile stations send an update message only when moving from one paging area to another (the only exception to this rule is that mobile stations transmit an update message at least once a day). The paging areas in this scheme are given, and are not subject to design. Thus, no attempt to optimize the cost per mobile station is made.

U.S. Pat. No. 4,737,978 describes another scheme for tracking a mobile station in a cellular wireless network. With this scheme, reporting is a function of time and not a function of mobile station movements in the network. This scheme also assumes that the partitioning of the network into searching areas is given, and there is no attempt to optimize searching areas to adapt to mobile station movements. Another scheme is presented in [4], where a static strategy for tracking mobile stations is suggested. In this strategy, a subset of all base stations of the network is selected, and all base stations belonging to this subset are designated as reporting centers. Each mobile station sends an update message only when it enters a cell whose base station is a reporting center. Whenever there is a need to communicate with a user, this mobile station is searched for in the vicinity of the cell in which the mobile station last reported. This strategy optimizes the global total cost, but this strategy is designed for cellular networks having certain cells with high density traffic.

U.S. Pat. No. 4,921,464 to Ito et al describes a searching scheme designed to reduce average consumed current in a receive search mode. With this invention, in the receive ready mode, priority channels are intermittently subjected to a receive search. In other periods than the receive search periods, no power is supplied to the receive circuit of each station and unit.

SUMMARY OF THE INVENTION

It is an object of this invention to provide for a flexible searching method that is dynamically adaptive to mobile station movements in a cellular network.

More specifically, it is an object of this invention to provide neighborhoods which dynamically change with mobile user movements in a cellular wireless network. These neighborhoods represent areas in which a mobile station is searched for when communications with the mobile station is desired.

Accordingly, this invention provides for an efficient method of tracking mobile stations in a cellular wireless network. The first step involves reporting a current cell in which a mobile station is located to a base station. Second, the number of intercellular movements of the mobile station is determined. If the number of intercellular movements reaches a certain minimal value, say L, the mobile station then reports to the base station from the cell in which it is now located. This latter cell now becomes the new current cell. Third, when communications with the mobile station is desired, the user is searched for in a neighborhood of the last current cell from which the mobile station reported to the base station. This neighborhood is the set of all cells reachable from the current cell by a path of length less or equal to $\leq L$, where L is the number of intercellular movements. That is, a given cell is in a neighborhood of a current cell if it is reachable from the current cell by a path which requires no more than L intercellular movements. Thus, with this invention a mobile station is searched for in part of the geographic area of a cellular wireless network where the mobile station is certain to be found.

DESCRIPTION OF THE PREFERRED EMBODIMENT

The description of the solution consists of two parts: In the first part, the underlying cellular system is described. In the second part, the dynamic strategy for tracking mobile stations is presented.

The System

Figure 1:
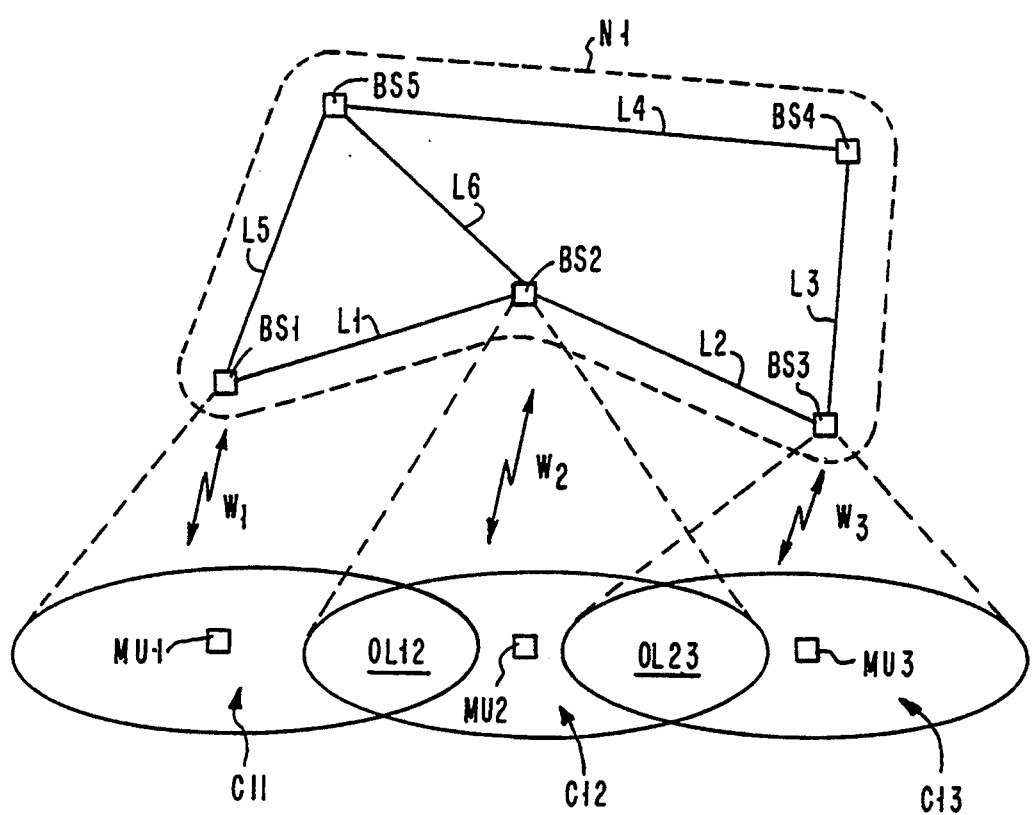
FIG. 1 schematically illustrates a cellular network where this invention is applied.

The cellular architecture is a two-level hierarchical structure (see FIG. 1): a level consisting of mobile stations (MU1-MU3), and a level comprising fixed stationary base stations (BS1-BS5). The mobile stations are the devices that are used by the mobile stations in order to communicate with the fixed network (N1) as well as to communicate with each other. The base stations are fixed devices that on one side communicate with the mobile stations through wireless links (W1-W3), and on the other side are connected to the fixed network by fixed links (L1, ..., L6). The wireless links can be based on any feasible technology, such as infrared or radio. The collection of base stations together with the fixed network form a wired backbone of the wireless network. Associated with each base station, there is a geographic area, referred to as a cell, within which a mobile station can communicate with that base station. For example, cell C11 is associated with base station BS1. In order to cover the entire area and to insure continuity of communications, cells must overlap. For example, cell C11 and cell C12 overlap in the area OL12, and cell C12 and cell C13 overlap in the area OL23. We assume that each base station transmits periodically a message containing its identity. By listening to these messages, a mobile user can determine with which base stations it can communicate. In particular, the mobile user can determine the quality of the communication channel to each of these base stations. For more details on cellular networks see [1].

The Strategy

Figure 2:
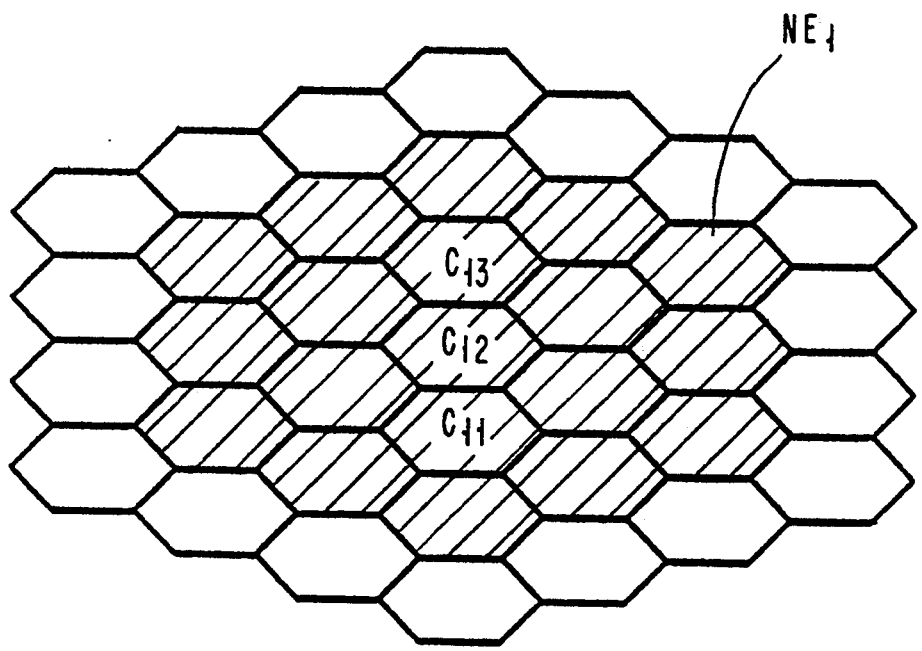
FIG. 2 schematically illustrates a current cell and its neighborhood.

The basic strategy suggested in this disclosure is as follows. Each mobile station maintains a counter which is incremented by one each time the location of this mobile station is changed from one cell to another. A mobile user is said to change its location from cell x of base station BX to cell y of base station BY, whenever the quality of the communication channel to BX drops below a certain level, and the quality of the communication channel to BY is the best among all base stations with which the mobile user can communicate at that time. For example, in FIG. 1, the border lines of each cell indicate the points where the quality of the communication channel to the base station of that cell drops below the above mentioned level. Associated with each mobile station there is also a parameter the value of which may be different for different users. The parameter of mobile station u is denoted by N(u). We define the L-neighborhood of cell x to be the collection of all cells that are reachable from cell x by a path of length at most L, where L is an integer $\geq 1$. Cell x is said to be reachable from cell y by a path of length at most L, if there exists a sequence of cells $x = x_0, x_1, \ldots, x_k = y$, such that the cells $x_i$ and $x_{i+1}$ are overlapping for all $i = 0, 1, \ldots, k-1$, and $k \leq L$. That is, cell x is in the L-neighborhood of cell y if x is reachable from y by a path which requires no more than L intercellular movements. For example, in FIG. 2 each hexagon represents a cell, and two adjacent hexagons represent overlapping cells. In this figure, for $L = 2$, the 2-neighborhood of cell C12 is the shaded area NE1. To see this, note that every shaded cell can be reached from cell C12 by at most two intercellular movements, while in order to reach any non-shaded cell, at least three intercellular movements are required.

When a mobile unit is first turned on, it sends an update message to the base station associated with the cell in which it is initially located, and sets its counter to zero. This cell thus becomes the current cell of this user. The rules for the update and the find operations are as follows.

Update

Each time mobile station u increments its counter by one (i.e., each time mobile station u changes its location from one cell to another), it then examines the value of its counter. If the counter reached the value $N(u) + 1$, then mobile station u transmits an update message to the base station associated with the cell in which u is currently located. The update message contains the identification of the mobile station u and the value of its parameter N(u). This cell becomes the current cell of mobile station u. Thereafter, mobile station u resets the value of its counter to zero.

Find

Whenever there is a need to communicate with mobile station u, this mobile station is searched for in all cells that are in the L-neighborhood of the cell in which u last sent an update message, where $L = N(u)$. Note that each base station knows the topology of the network and therefore each base station knows all its L-neighborhoods for any value of L.

Figure 3:
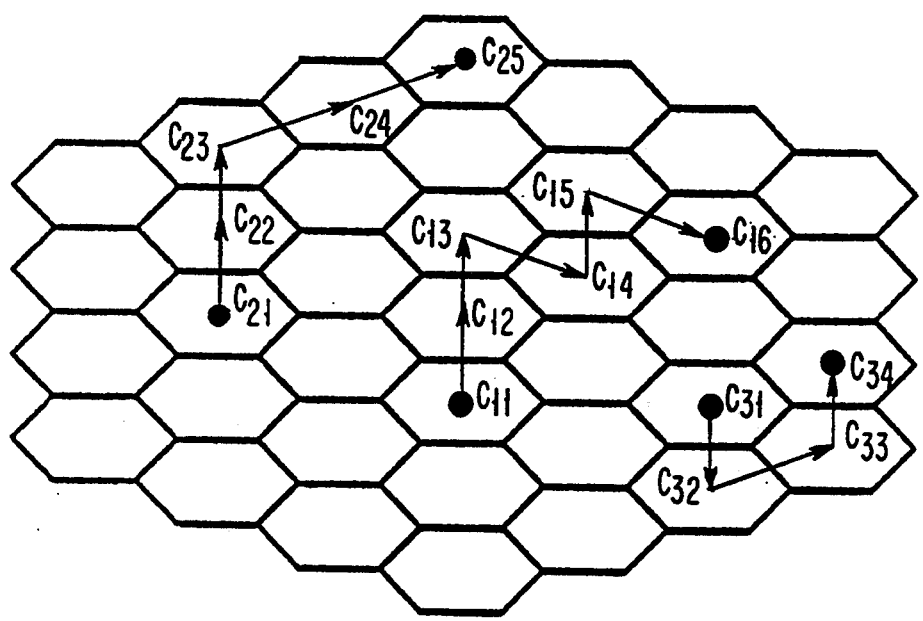
FIG. 3 schematically illustrates the intercellular movements of three mobile stations.

For example, in FIG. 3 there are three mobile users, MU1-MU3. Initially, MU1 is located in cell C11, MU2 is located in cell C21, and MU3 is located in cell C31. All three mobile stations are turned on while in these locations, and therefore C11 becomes the current cell of MU1, C21 becomes the current cell of MU2, and C31 becomes the current cell of MU3. We assume that N(MU1)=5, N(MU2)=4, and N(MU3)=3. Suppose now that these mobile stations follow the paths depicted in FIG. 3. Then the next current cell of MU1 is C16, the next current cell of MU2 is C25, and the next current cell of MU3 is C34.

The rationale behind this strategy is that if the last cell in which user M has sent an update message is x, then u must be in one of the cells that are in the L-neighborhood of x, where L=N(u). Thus, the search for any mobile station is always restricted to a neighborhood of some cell (which is a small subset of the whole network), while update messages are sent only as a result of specific moves (the number of which is small compared to the total number of moves made by the mobile stations in the network).

The particular selection of the parameter N(u) for each mobile station is crucial, as it determines the efficiency of the strategy. Increasing this parameter clearly decreases the cost of the update operation, as each mobile station will send update messages less often. However, this also increases the cost of the find operation, as the neighborhoods become larger.

Our approach in selecting the value of the parameter N(u) for mobile station u is as follows. Let a(u) be a constant representing the cost incurred by sending one update message by mobile station u, and let b(u) be a constant representing the cost incurred by searching for mobile station u in one cell. For example, a(u) can be chosen such that it reflects the amount of energy consumed from the battery of the mobile station by a transmission of an update message. The constant b(u) can be chosen, for example, such that it reflects the additional load on the wireless link in a cell due to a search for a mobile user in that cell. The exact way by which the values of these constants are determined is irrelevant to the present invention, and is up to the designer of the system. We define the total cost C(u) for user u over the time interval T by C(u)=a(u)M(u)+b(u)F(u), where M(u) is the number of update messages sent by u during the time interval T, and F(u) is the number of cells in which user u was searched for during this time interval. For example, T could be 1 hour, 1 day, etc.. The exact way by which the value of T is determined by the designer of the system. Clearly, for a given pattern of movements of mobile station u during T, both M(u) and F(u) depend on the value of N(u), and it is straightforward to compute them. The goal is to select a value for N(u) which minimizes the total cost C(u).

A simple way to select the value of N(u) is as follows. The system determines the value of this parameter periodically, every T time units. During each of these time intervals of length T, the system records the history of events regarding mobile station u. The events recorded include the movements of mobile station u and the exact time instants at which the system had to locate this user. At the end of each such time interval of length T, the system calculates by exhaustive search over all possible values of N(u) (the maximum value of which is the number of cells in the network) the value of N(u) which minimizes the cost function C(u). The value of N(u) for the next time interval of length T is set to be this value.

REFERENCES

1. William Lee, "Mobile Cellular Telecommunications Systems," New York: McGraw-Hill, 1989.
2. Proceedings of IBM Wireless Communications Symposium, Raleigh, N.C., Apr. 22-26, 1991.
3. K. Natarajan, "Distributed Algorithms for Keeping Track of Mobile Users in a Wireless Network System with Multiple Overlapping Cells," IBM Docket YO990-117, Ser. No. 605,723, filed Oct. 29, 1990.
4. A. Bar-Noy and I. Kessler, "Tracking Mobile Users in Wireless Networks," IBM Docket YO992-030 to be filed simultaneously with this patent application.

What is claimed is:

1. A method of tracking a mobile station u of a cellular network, comprising:
    (a) reporting a first cell in which said mobile station is located to a base station of said network;
    (b) determining the number of intercellular movements made by said mobile station after having reported its arrival in said first cell in step (a);
    (c) repeating steps (a) and (b) each time after said mobile station makes an additional N(u)+1 intercellular movements after having last reported its cell location as in step (a) but from the cell in which said mobile unit is in each time an additional N(u)+1 intercellular movements are made, where N(u) is a predetermined number for said mobile unit u; and
    (d) when communications with said mobile station is desired, searching for said mobile station in a L-neighborhood of a current cell, said current cell being the last cell from which said mobile unit last reported its location as in step (c), with said neighborhood being a set of all cells reachable by said mobile station travelling from said current cell along any path of length $\leq L$, where $L=N(u)\geq 1$, where the length of said path is the number of intercellular movements made as one travels from one end of said path to another end of said path.

2. A method as recited in claim 1, wherein N(u) is determined by selecting the value of N(u) for which C(u) is a minimum, where C(u)=a(u) M(u)+b(u) F(u), where a(u) is the cost of sending an update message by said mobile station u, b(u) is the cost incurred by searching for said mobile station u in a cell, M(u) is the number of update messages sent by mobile station u during a time interval T, and where F(u) is the number of cells in which said mobile station u was searched for in a time interval T.

3. A method as recited in claim 1, wherein the number of intercellular movements of said mobile station calculated by increasing the value of a counter for each intercellular movement of said mobile station.

4. An apparatus for tracking a mobile station in a cellular network comprising:
    (a) means for reporting a first cell in which said mobile station is located to a base station of said network;
    (b) means for determining the number of intercellular movements of said mobile station after having reported its arrival in said first cell in step (a);
    (c) means for repeating steps (a) and (b) each time after said mobile station makes N(u)+1 intercellular movements after having last reported its cell location as in step (a) but from the cell in which said mobile unit is in each time an additional N(u)+1 intercellular movements are made, where $N(u)$ is a predetermined number for said mobile unit u; and (d) means for, when communications with said mobile station is desired, searching for said mobile station in a L-neighborhood of said current cell, said current cell being the last cell from which said mobile unit reported its location as in step (c) with said neighborhood being a set of all cells reachable by said mobile station by travelling from said current cell along any path of length $\leq L$, where $L=N(u)\geq 1$, where the length of said path is the number of intercellular movements made as one travels from one end of said path to another end of said path.

* * * * *